United States Patent [19]

Biber

[11] B 4,001,640
[45] Jan. 4, 1977

[54] SINGLE TRIGGER PHOTOGRAPHIC STROBE UNIT

[75] Inventor: Conrad H. Biber, Needham, Mass.

[73] Assignee: Polaroid Corporation, Cambridge, Mass.

[22] Filed: Aug. 29, 1974

[21] Appl. No.: 501,503

[44] Published under the second Trial Voluntary Protest Program on March 2, 1976 as document No. B 501,503.

Related U.S. Application Data

[63] Continuation-in-part of Ser. No. 320,447, Jan. 2, 1973, abandoned.

[52] U.S. Cl. .......................... 315/241 P; 331/112; 331/117 R; 354/145

[51] Int. Cl.² ....................................... H05B 41/29

[58] Field of Search ........ 315/241 P, 209 CD, 183, 315/241, 241 R; 307/150; 321/18; 354/135, 145

[56] References Cited

UNITED STATES PATENTS

| | | | |
|---|---|---|---|
| 3,569,779 | 3/1971 | Luursema | 315/183 |
| 3,644,818 | 2/1972 | Paget | 321/18 |
| 3,758,822 | 9/1973 | Wilwerding | 315/241 P |
| 3,764,849 | 10/1973 | Ohta | 315/241 P |

Primary Examiner—Siegfried H. Grimm
Attorney, Agent, or Firm—John W. Ericson; Edward S. Roman

[57] ABSTRACT

A photographic flash system in which the storage capacitor for a flash tube is charged only before each flash exposure by a charge control circuit actuated by a pushbutton. The control circuit responds to the discharge of the capacitor through the flash tube to stop the charging process until it is reinitiated by operation of the pushbutton.

15 Claims, 5 Drawing Figures

SINGLE TRIGGER PHOTOGRAPHIC STROBE UNIT

This application is a continuation-in-part of copending U.S. Application for Letters Pat. Ser. No. 320,447, filed on Jan. 2, 1973, now abandoned, for SINGLE TRIGGER PHOTOGRAPHIC STROBE UNIT and assigned to the assignee of this application.

This invention relates to photography, and particularly to a novel electronic flash unit for photographic illumination.

An electronic flash unit employing a gas discharge tube is an extremely convenient primary or auxiliary source of light for photographic purposes. Such a unit can be light and compact, and requires only a suitable power supply for a great many exposures over an indefinite period of time.

For most purposes, it is desired to have the camera and flash unit completely portable and independent of the surroundings. Accordingly, primary or secondary batteries are commonly used to supply power for operating the flash unit.

A significant factor limiting the convenience of battery powered electronic flash units is the length of time that the apparatus can be used effectively without replacing or recharging the batteries. Another factor of considerable importance to the user is the recycle time, or the necessary minimum interval between flashes. Recycle time is essentially the time required to recharge a storage capacitor with enough energy to produce a light flash of the required intensity when the capacitor is discharged through a gas-filled flash tube.

A battery power supply is commonly designed to produce a voltage considerably below the voltage required for flash tube operation. The necessary high voltage is usually derived from the battery voltage by a DC to AC converter, connected between the battery and the charging circuit for the capacitor, and including a voltage amplifying transformer. Such a charging network usually draws an initially large current from the battery, which tapers to a low steady state value. The steady state value depends on all of the losses in the charging circuit, and in particular, on the leakage through the storage capacitor. This steady state current flows until the unit is triggered to produce a flash, whereupon the large initial current is again required from the battery.

In a typical system employing a nominally 6 volt battery power supply, the maximum current drain required of the battery is about 1½ amperes, and the steady state standby value may be approximately 100 milliamperes. Such a steady state current is obviously quite small compared to the full load current, and the power drain on the battery is correspondingly low. However, suppose that a particular flash unit required an average current drain of 1½ amperes at 5 volts for 10 seconds for a full charge. That would be 75 watt seconds of energy required from the battery for one flash, if the unit was triggered as soon as it was fully charged. Assuming a steady state current of 100 milliamperes, if the unit was left on and fully charged for only 2½ minutes, the same amount, 75 watt seconds, of additional energy would be taken from the battery.

It is quite common for a photographer to turn his electronic flash unit on at the beginning of a picture taking session, and to leave it on until he is finished, even though most of the time during the picture taking session the unit is fully charged. And, even though the unit is left on during the entire session, it still requires the minimum recycle time between exposures for recharging. The object of this invention is to save a large part of the power that is normally lost in this fashion, without reducing the speed at which pictures may be taken, and thereby extend the life of the battery and correspondingly reduce the frequency with which it must be replaced or recharged.

Briefly, the above and other objects of the invention are obtained by a novel strobe charging circuit in which essentially no power is dissipated until a manually operable pushbutton is depressed. Thereupon, a charging circuit is rendered effective to charge a storage capacitor for the flash tube in the strobe unit. When the strobe unit is triggered to produce a flash, the charging circuit is disabled, so that, again, substantially no power is dissipated. Preferably, means are also provided to disable the charging circuit automatically if the pushbutton is depressed, so that the capacitor is charged, and the user does not then take a picture within a predetermined time. For some time thereafter, briefly depressing the pushbutton will enable the unit to be flashed within a shorter time than the usual recycle time.

The manner in which the apparatus of the invention is constructed, and its mode of operation, will best be understood in the light of the following detailed description, together with the accompanying drawings, of a preferred embodiment thereof.

Figures 1, 2:
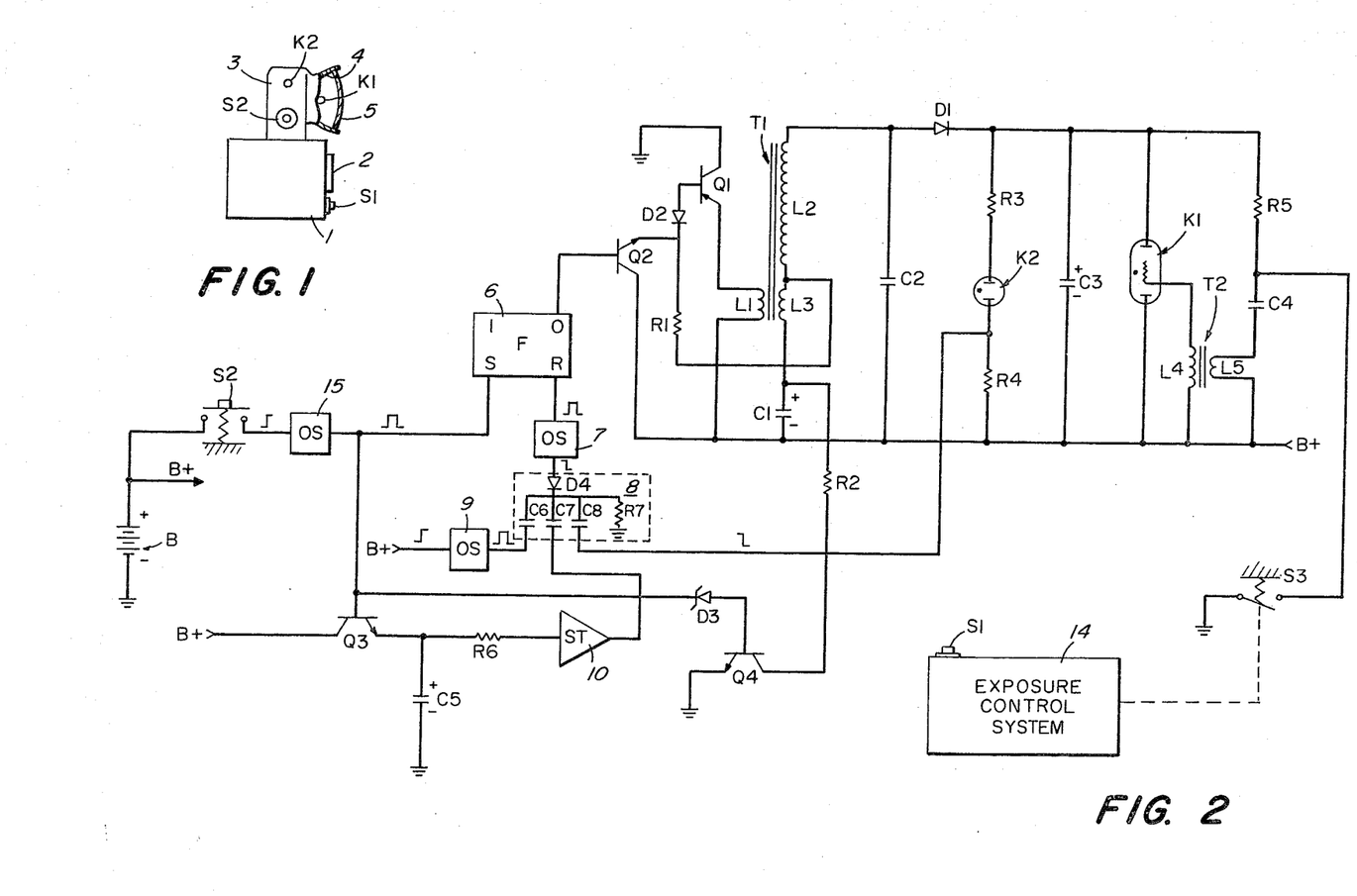
FIG. 1 is a schematic elevational sketch, with parts shown in cross section and parts broken away, of a camera equipped with a flash unit in accordance with the invention.
FIG. 2 is a schematic block and wiring diagram of a control system suitable for use in the apparatus of FIG. 1.

Referring to FIG. 1, there is shown a camera 1 of any conventional construction, provided with a lens 2 and a conventional shutter pushbutton S1. The pushbutton S1 may be an electrical switch, a mechanical actuator, or a combination of both, depending on the type of camera employed.

Mounted on the camera 1 is a strobe unit, generally designated 3, incorporating a suitable flash discharge tube K1, such as a conventional Xenon filled, 300 volt flash tube or the like. The tube K1 is disposed in a suitable reflector 4 behind a lens 5 of any conventional design suitable for directing light from the lamp K1 into the angle of view of the camera taking lens 2.

A ready lamp K2, which may be a conventional neon-filled gas discharge tube, is visible through a suitable port in the unit 3. A pushbutton S2, such as a manually operable, spring returned pushbutton switch, is also disposed on the unit 3.

The internal construction, and the mode of operation, of the apparatus just generally described will be considered in detail below. From the user's point of view, operation consists in first momentarily pressing the pushbutton S2, waiting until the ready lamp K2 glows to indicate that the flash unit is ready for operation, and then making the exposure by depressing the pushbutton S1.

FIG. 2 shows the control system for the apparatus of FIG. 1. Power for the apparatus is supplied by a conventional battery B, which may be one or more series or parallel-connected batteries that may be either primary or secondary types, or a combination of types. The illustrated battery B is shown as having a negative terminal connected to ground, and a positive terminal at a potential B+ that is connected to the various circuits of FIG. 2 where that symbol is shown.

The battery B may be located in the strobe unit 3, in the camera 1, or in a cassette containing film units for use in the camera. In any event, when in position, it is connected to the circuits of the strobe unit of FIG. 2 in the manner shown.

The strobe unit of FIG. 2 basically comprises a voltage converter energized by the battery B and producing an alternating current at a relatively high voltage from the relatively low voltage of the battery. The voltage converter comprises a transformer T1 and a transistor Q1 connected as an oscillator in a manner to be described.

A starting circuit for the oscillator comprises a capacitor C1 and a resistor R2. The oscillator is tuned by a capacitor C2. A rectifier, shown as a diode D1, is provided to take power from the output circuit of the oscillator and supply it to charge a capacitor C3.

The camera 1 is assumed to be provided with any conventional form of exposure control system, generally designated 14, which responds to operation of the shutter pushbutton S1 to close a switch S3 at the time when the shutter of the camera is opened to an aperture appropriate for the discharge of the flash tube K1. When the switch S3 is closed, a ground lever trigger pulse is supplied to the strobe unit to cause the capacitor C3 to discharge through the tube K1.

More specifically, the transistor Q1 is of the pnp type, having its collector connected to ground and its emitter returned to B+ through a low voltage primary winding L1 of the transformer T1. The transformer T1 has a tapped secondary winding comprising a high voltage section L2 and a low voltage section L3.

A tap at the junction of the sections L2 and L3 is connected to the base of the transistor Q1 through a resistor R1 and a diode D2. As shown, the diode D2 has its anode connected to the base of the transistor Q1, so that it preferentially conducts current in the same direction as the emitter-base junction of the transistor.

The purpose of the diode D2, and of the location of the winding L1 relative to the transistor Q1, is to make it possible to control the transistor Q1 from the battery potential at B+, without introducing additional impedances in the path between B+ and ground that includes the transformer primary winding L1 and the emitter-to-collector path through the transistor Q1. Avoiding such additional impedances results in a minimum difference between the battery potential and the potential available for application to the winding L1.

An npn transistor Q2 has its collector connected to the supply terminal at B+, and its emitter connected to the cathode of the diode D2. It will be apparent that when the emitter of the transistor Q2 is biased forward with respect to its base, the cathode of the diode D2 will be brought near B+, so that the transistor Q1 will be unable to turn on.

The base of the transistor Q2 is connected to the logic 0 output terminal of a conventional flip-flop 6, controlled in a manner to be described to produce a logic 1 signal (positive with respect to ground) at its logic 0 terminal when the flip-flop is reset by a positive pulse applied to its reset input terminal R, and to produce an essentially ground level potential at its logic 0 output terminal when the flip-flop is set by the application of a positive pulse to its set input terminal S.

A circuit path extends from the upper terminal of the secondary winding L2 of the transformer T1 through a capacitor C2, a capacitor C1 in series with the capacitor C2, and thence to the lower terminal of the lower section L3 of the secondary winding. The upper terminal of the capacitor C1 is connected through a resistor R2 to the collector of an npn transistor Q4. The emitter of the transistor Q4 is grounded as shown.

The base of the transistor Q4 is connected to the anode of a zener diode D3. The cathode of the diode D3 is connected to the active output terminal of a conventional one shot multivibrator 15. When the multivibrator 15 is triggered in a manner to be described, it produces a positive pulse that causes the zener diode D3 to break down and conduct current in the reverse direction, switching the transistor Q4 into conduction.

It will be apparent that by the arrangement just described, when the zener diode D3 breaks down to bias the base of the transistor Q4 positive with respect to its emitter, a pulse of current will flow through the resistor R2 to charge the capacitor C1 to a polarity opposite that shown in the drawings. This pulse is employed to start the oscillator, in a manner to be described below.

The charging circuit for the capacitor C3 extends from the upper terminal of the winding L2, from the anode to the cathode of the diode D1, through the capacitor C3, through the capacitor C1, and back to the lower terminal of the secondary winding of the transformer T1. This circuit is effective to charge the capacitor C3 at times when the upper terminal of the secondary winding of the transformer T1 is positive with respect to the upper terminal of the capacitor C3.

The ready light K2 is connected to the upper terminal of the capacitor C3 through a resistor R3, and to the lower terminal of the capacitor C3 through a resistor R4. At a predetermined voltage sufficient to fire the flash tube K1, the lamp K2 will discharge and glow, indicating that the apparatus is ready for an exposure.

The discharge tube K1 has load terminals comprising a cathode connected to the lower terminal of the capacitor C3, and an anode connected to the upper terminal of the capacitor C3. A triggering grid for the tube is returned to the terminal at B+ through the secondary winding L4 of a pulse transformer T2. The primary winding L5 of the transformer T2 is connected between the supply terminal at B+ and one terminal of the capacitor C4. The other terminal of the capacitor C4 is returned to the cathode of the diode D1 through a current limiting resistor R5.

The capacitor C4 will be charged with its upper terminal positive with respect to the terminal at B+ as the capacitor C3 is charged. When a ground level trigger pulse is supplied to a trigger input terminal at the junction of the capacitor C4 and the resistor R5, the capacitor C4 will be abruptly discharged, causing a pulse of current to flow through the primary winding L5 and induce an oscillatory ringing pulse having a maximum amplitude of, for example, 5,000 volts, across the secondary winding L4. That will excite the grid of the discharge tube K1 and allow the tube to discharge, producing a flash exposure.

When the flash occurs, the capacitor C3 will be discharged, and the lamp K2 will be extinguished. The voltage across the resistor R4 will fall, producing a signal that is employed in a manner to be described below to deactivate the charging circuit.

The pushbutton S2 is connected between the supply terminal at B+ and the active input terminal of the one shot multivibrator 15. At the rising leading edge of the pulse produced when the switch S2 is momentarily closed, the one shot multivibrator 15 is triggered to produce a positive going output pulse that sets the flip-flop 6. This pulse is also applied to the zener diode D3, as described above, and to the base of an npn transistor Q3. The transistor Q3 has its collector connected to the supply terminal at B+. The emitter of the transistor Q3 is returned to ground through a capacitor C5.

The capacitor C5 is thus rapidly charged when the one shot multivibrator 15 produces its output pulse to gate the transistor Q3 into conduction. The time constant of the multivibrator 15 is selected so that the capacitor C5 is charged to a voltage near B+ before the transistor Q3 is turned off at the end of the pulse from the multivibrator 15.

The voltage across the capacitor C5 is applied to the active input terminal of a conventional Schmitt trigger circuit 10 through a resistor R6. The Schmitt trigger is arranged to produce a "high" voltage signal that is positive with respect to ground when the input signal goes above a turn-on value, and to produce a "low" voltage output, near ground, when the input signal falls below a turn-off value. For the purposes of this invention, the turn-on and turn-off values of the Schmitt trigger 10 may be substantially identical. The capacitor C5, the resistor R6, and the input impedance of the Schmitt trigger 10 are selected to give a time constant of, for example, from one to two minutes, during which the voltage at the input of the Schmitt trigger 10 falls from a value well above its turn-on point to a voltage at its turn-off point.

The active output terminal of the Schmitt trigger 10 is connected to one input terminal of a pulse transition OR gate 8. The gate 8 comprises three capacitors C6, C7 and C8 each having one terminal connected to ground through a resistor R7. The other terminals of the capacitors C6, C7 and C8 serve as the active input terminals of the gate 8. A diode D4 has its cathode connected to the junction of the resistor R7 and the capacitors C6, C7 and C8. The anode of the diode D4 is connected to the active output terminal of the gate 8.

When any input terminal of the gate 8 goes toward ground, the negative pulse produced across the resistor R7 and transmitted by the diode D4 triggers a conventional one shot multivibrator 7 to produce a positive output pulse. That pulse sets the flip-flop 6.

The supply terminal at B+ is connected to the input terminal of a conventional one shot multivibrator 9. The multivibrator 9 produces an output pulse at the rising leading edge of the transition of the supply potential to B+ when a new battery is first inserted; or when power is otherwise first applied to the circuit. The trailing edge of the pulse from the multivibrator 9 serves to reset the flip-flop 6 to insure that the apparatus starts in the appropriate condition.

A third input terminal of the OR gate 8 is connected to the junction of the resistor R4 and the ready light K2. The multivibrator 7 is triggered by this circuit when the capacitor C3 is discharged through the flash tube K1, and the lamp K2 is accordingly extinguished.

Having thus described the construction of this embodiment of the invention, its operation will next be described.

Initially, with the switch S2 open and the switch S3 open, the apparatus will be in a standby state with the transistors Q1 and Q2 nonconducting. The flip-flop 6 will be reset, the transistors Q3 and Q4 will be cut off, and the output terminal of the Schmitt trigger 10 will be at a low potential. Under these conditions, only a very small current, required to keep the low level logic circuits in operation, is drawn by the battery. If desired, the switch S1 might be supplemented by an on/off switch in series with the battery B, to interrupt even this small current. However, that refinement is not essential for most practical purposes, and makes the operation of the apparatus of FIG. 1 more complex from the user's point of view, so that errors in operation are more likely to occur.

When the switch S2 is momentarily closed, the one shot multivibrator 15 produces an output pulse. This pulse sets the flip-flop 6, and turns on the transistor Q3 for an interval sufficient to charge the capacitor C5 to a voltage near B+. The Schmitt trigger 10 will produce a positive output signal with respect to ground, but that will have no effect on the other circuits.

The pulse from the multivibrator 15 is also applied to the cathode of the zener diode D3, causing the diode D3 to break down and conduct current in the reverse direction, gating the transistor Q4 into conduction. A charging pulse of current for the capacitor C1 will now flow from the supply terminal at B+ through the capacitor C1, through the resistor R2 and through the collector-to-emitter path of the transistor Q4 to ground.

The negative potential at the upper terminal of the capacitor C1 is now supplied through the lower section L3 of the secondary winding of the transformer T1 and through the resistor R1 and the diode D2 to bias the emitter of the transistor Q1 forward with respect to the base. That causes a surge of current to flow through the winding L1, inducing a pulse of voltage across the secondary winding of the transformer T1.

The capacitor C2 is chosen to tune the tank circuit, including the windings L2 and L3 and the capacitors C1 and C2, to a convenient frequency, such as 5 to 15 KHz. Thus an initially damped oscillation at that frequency will be set up in the secondary circuit. The polarity of the primary and secondary windings of the transformer T1 are selected so that as current increases through the winding L1, the upper terminal of the low voltage section L3 goes negative, biasing the transistor Q1 into conduction.

When the upper terminal of the winding L3 subsequently goes positive, it will cut off the transistor Q1. The rapidly decreasing current in the winding L1 will induce a regenerative component in the secondary windings, so that energy is transferred to the secondary windings to sustain oscillation on both half-cycles of the secondary voltage waveform.

When the voltage at the upper terminal of the winding L2 goes higher than the upper terminal of the capacitor C3, the diode D1 will conduct current to charge the capacitor C3. That will clip the positive half cycle of the wave across the transformer secondary. The negative half cycle will be unaffected. That will cause the capacitor C1 to be asymmetrically charged to a voltage with the polarity shown in the drawings, such that the capacitor C1 produces a voltage that will cut off the transistor Q1 except when it is opposed and overcome by a corresponding negative voltage induced across the winding L3.

When the capacitor C3 is charged to the desired voltage, the lamp K2 will discharge and current will flow through the resistors R3 and R4. The resulting voltage increase across the resistor R4 will not be transmitted to the input terminal of the multivibrator 7, because the transition is not in the direction passed by the gate 8.

The apparatus is now in condition for an exposure, if one is made by depressing the pushbutton S1 before the timing circuit comprising the capacitor C5 and the resistor R6 causes the Schmitt trigger 10 to produce a falling output potential. Assuming that an exposure is not made within this time limit, the falling potential at the output of the Schmitt trigger 10 triggers the multivibrator 7 to reset the flip-flop 6.

When the flip-flop 6 is reset, the transistor Q2 will be turned on, and will prevent the transistor Q1 from being turned on when the upper terminal of the winding L3 goes negative with respect to the lower terminal. That will quench oscillation in the secondary circuit, because no energy is being supplied.

The capacitor C1 will gradually charge, through the resistor R1 and the emitter-to-collector path of the transistor Q2, until its potential rises to a value at which no current flows through the transistor Q2. Over a period of time, this charge will gradually be dissipated through the various reverse-biased junctions in the circuit.

The capacitor C3 will remain charged for a time. Thus, if the photographer decides to make ready for a picture, and again depresses the pushbutton S2, the ready light K2 will go on sooner than it initially did by an interval dependent on the amount of charge remaining in the capacitor C3. Of course, this charge will eventually dissipate, through internal leakage in the capacitor, and other minor leakage effects.

When the ready lamp is lit, and before the time for the resetting operation just described is expired, the photographer may make an exposure by pushing the button S1. That will cause the synchronizing switch contacts S3 to be closed at the proper time. Closing the switch S3 will cause a ground level trigger pulse to be applied to the junction of the capacitor C4 and the resistor R5.

The capacitor C4 will abruptly discharge, producing a pulse across the primary winding L5 of the pulse transformer T2 for the purposes described above, causing the capacitor C3 to discharge through the lamp K1 and produce a flash. The lamp K2 will now be extinguished, and current will be interrupted through the resistor R4. The falling voltage transition produced across the resistor R4 in this manner will be applied through the gate 8 to trigger the one shot multivibrator 7, causing the flip-flop 6 to be reset. That will turn on the transistor Q2, quenching oscillation of the voltage converter in the manner described above. Following such a flash, with the capacitor C3 essentially completely discharged, the full recycle time will be required before the next exposure can be made.

Figures 3, 4:
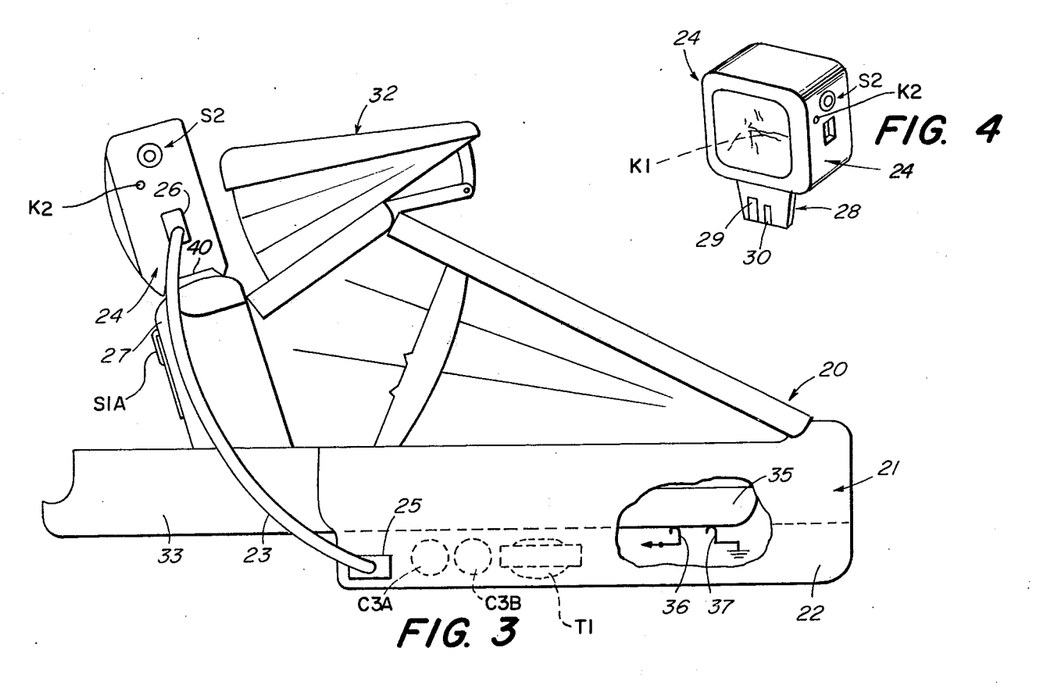
FIG. 3 is a schematic elevational view of another camera equipped with a flash unit in accordance with another embodiment of the invention.
FIG. 4 is a schematic perspective sketch of a reflector unit shown installed on the camera in FIG. 3.

FIG. 3 shows a modification of the invention which is organized about an automatic single lens reflex camera such as that shown and described in U.S. Pat. No. 3,714,879, issued on Feb. 6, 1973 to Edwin H. Land, Igor Blinow and Vaito K Eloranta for REFLEX CAMERA, and assigned to the assignee of this application. Indeed, the camera to be described in connection with FIGS. 3 through 5 may be identical which that shown and described in the above-cited patent, the entirety of which is hereby incorporated herein by reference, with the exception of modifications to be described.

Referring to FIG. 3, the camera 20, as more fully shown and described in the cited patent, is a fully automatic single lens reflex that is foldable into a thin compact shape. It is shown in FIG. 3 in the erected position. In that position, when supplied with a cassette including film units and a battery, the camera responds to the touch of a button to produce a photograph that is immediately driven out of the camera, and there proceeds to complete its development.

As shown in FIG. 3, the housing 21 of the camera 20 is provided with an enlarged lower portion 22, relative to the shape and size of the housing in the above-cited patent, which is adapted to house portions of the electronic flash unit. As suggested in FIG. 3, a cassette 35 in loaded position in the camera 20 includes a battery, which serves to provide power for the film advance motor and for the exposure cycle control system in the camera. In accordance with the invention, this battery is also adapted to supply power to the electronic flash unit. For this purpose, the terminals 36 and 37 which are provided in the camera to contact the battery in the cassette 35 are connected to the electronic flash unit in a manner to appear. In order to reduce the thickness of the additional housing portion 22 required to house certain electronic components of the electronic flash unit, those components of the flash unit which are of the largest inherent dimensions are especially selected and arranged to have their principal dimensions in a plane parallel to the principal dimensions of the camera in its folded state. For that purpose, the transformer T1 is made of thin, flat, compact design, and the storage capacitor C3 is preferably made of four tubular capacitors, of which capacitors C3A and C3B are suggested in dotted lines in FIG. 3, so that only a relatively minor extension in the thickness of the camera is required, and no changes in the major dimensions of the camera are needed.

Those components of the electronic flash unit which are located in the housing portion 22 are connected to other components of the flash unit over a cable 23. The cable 23 is connected to a reflector unit 24. For this purpose, the cable 23 is connected to the housing 22 by a conventional detachable plug 25, and to the reflector unit 24 by a conventional detachable plug 26.

The ready light K2 and the pushbutton S2 are located on the reflector unit 24 as in the previously described embodiment. The positions shown are merely to illustrate the functional association of these components with the reflector housing. Preferably, the ready light K2 would be at the back of the reflector unit 24, to be visible in the erect position of the folding viewfinder 32. The pushbutton S2 is most conveniently located on the right side of the reflector housing, rather than on the left side as shown.

Comparing FIGS. 3 and 4, the reflector unit 24 is provided with a blade 28 that extends down into an accessory socket 40, originally designed to accommodate a flash bar, in the lensboard and shutter housing 27. The blade 28, basically of an insulating material, is provided with at least two conducting segments 29 and 30, which engage corresponding contacts in the camera socket, as will appear.

As suggested in FIG. 3, the enlarged lower portion 22 of the housing 21 of the camera 20 is terminated at the forward end short of the hinged bed portion 33. This allows the bed 33 to be swung down to permit the user to load and unload the camera with cassettes such as 35.

Figure 5:
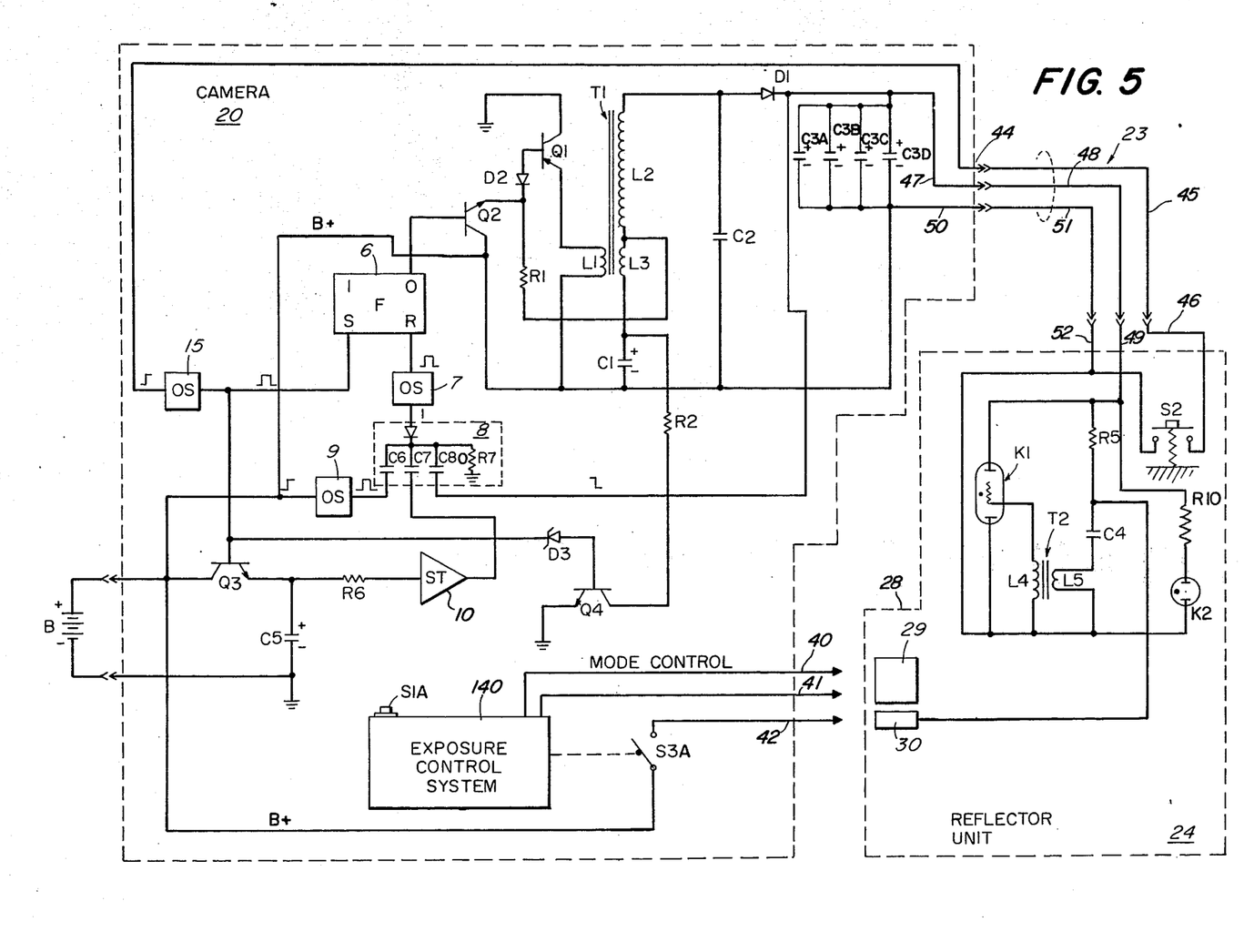
FIG. 5 is a schematic wiring diagram of the flash unit of FIGS. 3 and 4.

Referring next to FIG. 5, the relative disposition of the components of the electronic flash unit and its control system is shown. Those elements which are in the camera 20 are enclosed in the large dotted line block at the left of FIG. 5, and are schematically indicated as connectable to a battery B in the cassette 35 at the left of FIG. 5.

With exceptions to be noted, circuits shown in FIG. 5 are identical to those shown in FIG. 2, and corresponding parts are given corresponding reference characters. Certain modifications, to be described, are made in order to adapt the circuit to the particular disposition of components desired, and to be compatible with the Polaroid SX-70 Land Camera, and with the particular embodiment thereof shown in the above-cited patent, when modified as here described to accommodate the flash unit. For the purposes of this invention, the exposure control system 140 may take the particular form employed in the Polaroid SX-70 Land Camera. The shutter button S1A, located on the front of the lensboard 27 in FIG. 3, corresponds to the shutter button for the Polaroid SX-70 Land Camera modified in the respects described herein.

The exposure control system incorporates means for modifying the operation mode of the camera to convert between an ambient light state, in which a photoelectrically determined exposure is made, and a flash mode of operation in which the aperture is selected in dependance on the focused distance of the camera, and the switch S3A is closed when the shutter is opened to that aperture. For this purpose, the socket 40 in the lensboard 27 in FIG. 3 in which the blade 28 of the reflector unit 24 is inserted contains a pair of terminals 40 and 41 which are bridged by the contact 29 when the blade 28 is inserted in the camera. When the contacts 40 and 41 are bridged, the exposure control system 140 functions in the flash mode of operation described above.

The switch S3A in FIG. 5 is connected between the battery terminal at B+ and another terminal 42 in the camera's flash socket, which is adapted to be contacted by the terminal 30 on the blade 28. Accordingly, when the switch S3A is momentarily closed to initiate a flash exposure, the battery potential is applied to the terminal 30.

Components of the circuit of FIG. 2 which are included in the camera in the circuit of FIG. 5 include the timing circuit, comprising the transistor Q3, capacitor C5, resistor R6 and Schmitt trigger 10, that will turn off the charging circuit if a picture is not taken within a predetermined time as described above. The one shot multivibrator 15 which initiates the charging cycle, the one shot multivibrator 9 which assures that the flip-flop 6 is reset, the gate 8, the one shot multivibrator 7 and the flip-flop 6 are all included in the camera, as are the voltage converter comprising the transformer T1 and the transistor Q1, and the switching circuits comprising the capacitor C1, resistor R2, transistor Q4, zener diode D3, the transistor Q2, the diode D2 and the resistor R1, all functioning as described above. The capacitor C2 and the rectifier diode D1 are in the camera, as is the storage capacitor C3 which is made up of the four smaller capacitors C3A, C3B, C3C and C3D as described above.

The ready light K2 is placed in the reflector unit. Accordingly, the circuit which turns off the charging circuit when the flash is fired is modified somewhat. For this purpose, a capacitor C80 in the gate 8 is directly connected to the high voltage lead at the junction of the capacitor C3 and the diode D1. The capacitor C80 is selected to have a higher voltage rating than the corresponding capacitor C8 in the FIG. 2 circuit, because of the larger voltage to which it is exposed.

The input terminal of the one shot multivibrator 15 is connected to one connector terminal 44 that is connected over a lead 45 carried in the cable 23 to a corresponding terminal 46 in the socket on the reflector unit 24. Similarly, the upper side of the capacitor C3 is connected to a terminal 47 that is carried over a lead 48 in the cable 23 to a terminal 49 in the reflector unit 24. The lower side of the capacitor C3 is connected to a terminal 50 that is carried over a lead 51 in the cable 23 to a terminal 52 in the cable 23 to the reflector unit 24. It will be apparent that when the apparatus is connected together, the terminal 52 will be at the battery potential B+.

The charge initiating pushbutton S2 is mounted in the reflector unit 24, and is connected across the terminals 46 and 52. Accordingly, when the pushbutton S2 is momentarily depressed, it produces a rising transition that triggers the one shot multivibrator 15 as described above.

The ready light K2 is connected between the terminals 49 and 52 in series with a single current limiting resistor R10. As described above, the ready light K2 will produce a visible indication when the capacitor C3 is charged enough to made a proper exposure, but the ready light circuit performs no other function in this embodiment of the invention.

The discharge tube K1 is connected between the terminals 49 and 52 to be excited by current from the capacitor C3 when the tube is triggered. The trigger circuit comprising the transformer T2, the capacitor C4, and the resistor R5 are the same as described above. The trigger input signal is produced when the switch S3A is closed, shunting the charged capacitor C4 through the input winding L5 of the transistor T2.

Operation of the apparatus of FIG. 5 is essentially the same as that described above. When the battery B is first connected to the camera terminals, as by the insertion of a cassette 35 in the camera as diagrammatically indicated in FIG. 3, the one shot multivibrator 9 will be triggered. At the trailing edge of the pulse produced by the multivibrator 9 the gate 8 will trigger the one shot multivibrator 7 to cause the flip-flop 6 to be reset. The apparatus will then be in its quiescent state until the pushbutton S2 is momentarily depressed, whereupon the multivibrator 15 will produce its output pulse, setting the flip-flop 6 and causing the capacitor C3 to be charged as described above.

When the capacitor is charged, the ready lamp K2 will be lit. Thereafter, when the shutter button S1A is closed, the exposure control system will, at the proper time, momentarily close the switch S3A and discharging the capacitor C4 through the primary winding L5 of the pulse transformer T2, thus triggering the tube K1 and producing a flash exposure. The falling voltage transition at the upper side of the capacitor C3 will actuate the gate 8 through the capacitor C80, triggering the one shot multivibrator 7 and resetting the flip-flop 6. The apparatus will then be in its quiescent condition until the shutter button S2 is again depressed.

In accordance with another embodiment of the invention, the switch S2 can be mounted on the camera 20. That would require only two leads to be carried through the cable 23. The location of the switch S2 could be on the camera housing 22, or on the lensboard 27.

While the invention has been described with respect to the details of particular embodiments, many changes and variations will occur to those skilled in the art upon reading this description, and such can obviously be made without departing from the scope of the invention.

Having thus described the invention, what is claimed is:

1. A power conserving electronic flash unit, comprising a triggerable flash tube, a storage capacitor connected to said flash tube, a charging circuit connected to said capacitor and operable in response to an applied enabling signal to charge said capacitor, circuit means responsive to an applied trigger signal and effective when said capacitor is charged to trigger said flash tube and thereby discharge said capacitor through said flash tube, bistable means settable to first and second states, means controlled by said bistable means in its second state for applying an enabling signal to said charging circuit, manually operable means for setting said bistable means to its second state, and means responsive to the discharge of said capacitor through said flash tube for setting said bistable means to its first state.

2. The apparatus of claim 1, further comprising time delay means operated by said manually operable means when said bistable means is set to its second state for setting said bistable means to its first state after a predetermined interval.

3. An electronic flash system comprising a triggerable discharge tube, a storage capacitor, means connecting said capacitor to said tube to supply energy to said tube when said capacitor is charged and said tube is triggered and thereby produce a flash of light, a pair of terminals adapted to be connected to a source of electrical energy, charging circuit means operatively connected to said capacitor and to said terminals and effective in response to an applied enabling signal when a source of electrical energy is connected to said terminals to charge said capacitor, bistable means settable to first and second states, means controlled by said bistable means in its second state for applying an enabling signal to said charging circuit means, manually operable means for producing an initiating signal, means responsive to said initiating signal for setting said bistable means to said second state, time delay means responsive to said initiating signal for setting said bistable means to its first state a predetermined interval after said bistable means is set to its second state by said initiating signal, a voltage responsive glow lamp and a resistor connected in series across said capacitor to produce a ready light when said capacitor is charged to a predetermined voltage, and means responsive to the change in voltage across said resistor when said tube is triggered to discharge said capacitor for setting said bistable means to its first state.

4. An electronic flash attachment for a camera having synchronizing contacts for producing a flash triggering signal, comprising first and second input terminals adapted to be connected to a battery, bistable circuit means settable to first and second states, a pushbutton, means connected to said terminals and controlled by said pushbutton for setting said bistable circuit means to its second state when a battery is connected to said terminals and said pushbutton is operated, a discharge operated triggerable flash lamp, a capacitor connected to said flash lamp, trigger circuit means adapted to be connected to said terminals and responsive to a triggering signal applied thereto and effective when said capacitor is charged to discharge said capacitor through said flash lamp, charging circuit means connected between said terminals and said capacitor and controlled by said bistable circuit means to charge said capacitor when said bistable circuit means is in its second state and a battery is connected across said terminals, and means responsive to the discharge of said capacitor through said flash lamp for setting said bistable means to its first state.

5. The apparatus of claim 4, further comprising time delay means actuated when said bistable circuit means is set to its second state for setting said bistable circuit means to its first state after a predetermined interval.

6. An electronic flash system comprising a triggerable flash tube, a storage capacitor, means connecting said capacitor to said flash tube to supply energy to said tube when said tube is triggered and said capacitor is charged, charge control means settable to a first state and a second state for supplying charging current to said capacitor in said second state, manually operable means for setting said charge control means to said second state, and means responsive to the discharge of said capacitor through said flash tube for setting said charge control means to said first state.

7. The apparatus of claim 6, in which said means responsive to the discharge of said capacitor comprises a resistor, means connecting said resistor in series with said capacitor, and means responsive to the voltage transition produced across said resistor when said capacitor is discharged for setting said charge control means to said first state.

8. The apparatus of claim 7, further comprising a second capacitor, means comprising an electronic switch closed when said manually operable means is operated for charging said second capacitor to a first predetermined voltage, a second resistor, a trigger circuit having input terminals coupled to said second capacitor through said second resistor for producing a switching signal when said second capacitor discharges to a second voltage below said predetermined voltage, and means responsive to said switching signal for setting said charge control means to said first state.

9. A power conserving circuit for a camera having terminals adapted to be connected to a flash tube, a storage capacitor connected to said terminals, a charging circuit connected to said capacitor and operable in response to an applied enabling signal to charge said capacitor, bistable means settable to first and second states, means controlled by said bistable means in its second state for applying an enabling signal to said charging circuit, manually operable means for setting said bistable means to its second state, and means responsive to the discharge of said capacitor for setting said bistable means to its first state.

10. The apparatus of claim 9, further comprising time delay means operated by said manually operable means when said bistable means is set to its second state for setting said bistable means to its first state after a predetermined interval.

11. An electronic flash circuit for a camera having a pair of load terminals and a trigger terminal adapted to be connected to a triggerable discharge tube, said circuit comprising, a storage capacitor, means connecting said capacitor to said load terminals to supply energy thereto when said capacitor is charged, a pair of input terminals adapted to be connected to a source of electrical energy, charging circuit means operatively connected between said input terminals and said capacitor and effective in response to an applied enabling signal to charge said capacitor when a source is connected to said input terminals, bistable means settable to first and second states, means controlled by said bistable means in its second state for applying an enabling signal to said charging circuit means, means for producing an initiating signal, means responsive to said initiating signal for setting said bistable means to said second state, time delay means responsive to said initiating signal for setting said bistable means to its first state a predetermined interval after said bistable means is set to its second state by said initiating signal, and means responsive to the change in voltage across said capacitor when said capacitor is discharged for setting said bistable means to its first state.

12. An electronic flash control system for a camera having load terminals adapted to be connected to a triggerable flash tube, and input terminals adapted to be connected to a battery, said control system comprising bistable circuit means settable to first and second states, circuit means responsive to an externally applied initiating signal for setting said bistable circuit means to its second state when a battery is connected to said input terminals and said initiating signal is applied, a capacitor connected to said load terminals, charging circuit means connected between said input terminals and said capacitor and controlled by said bistable circuit means to charge said capacitor when said bistable circuit means is in its second state and a battery is connected across said input terminals, and means responsive to the discharge of said capacitor for setting said bistable means to its first state.

13. The apparatus of claim 12, further comprising time delay means actuated when said bistable circuit means is set to its second state for setting said bistable circuit means to its first state after a predetermined interval.

14. An electronic flash operating system comprising a storage capacitor, charge control means settable to a first state and a second state for supplying charging current to said capacitor in said first state, manually operable means for setting said charge control means to said first state, and means responsive to the discharge of said capacitor for setting said charge control means to said second state.

15. The apparatus of claim 14, further comprising a second capacitor, means comprising an electronic switch closed when said manually operable means is operated for charging said second capacitor to a first predetermined voltage, a second resistor, a trigger circuit having input terminals coupled to said second capacitor through said second resistor for producing a switching signal when said second capacitor discharges to a second voltage below said predetermined voltage, and means responsive to said switching signal for setting said charge control means to said second state.

* * * * *